P. PETERSON.
INTERNAL COMBUSTION ENGINE.
APPLICATION FILED JUNE 1, 1909.
978,058.
Patented Dec. 6, 1910.
4 SHEETS—SHEET 1.
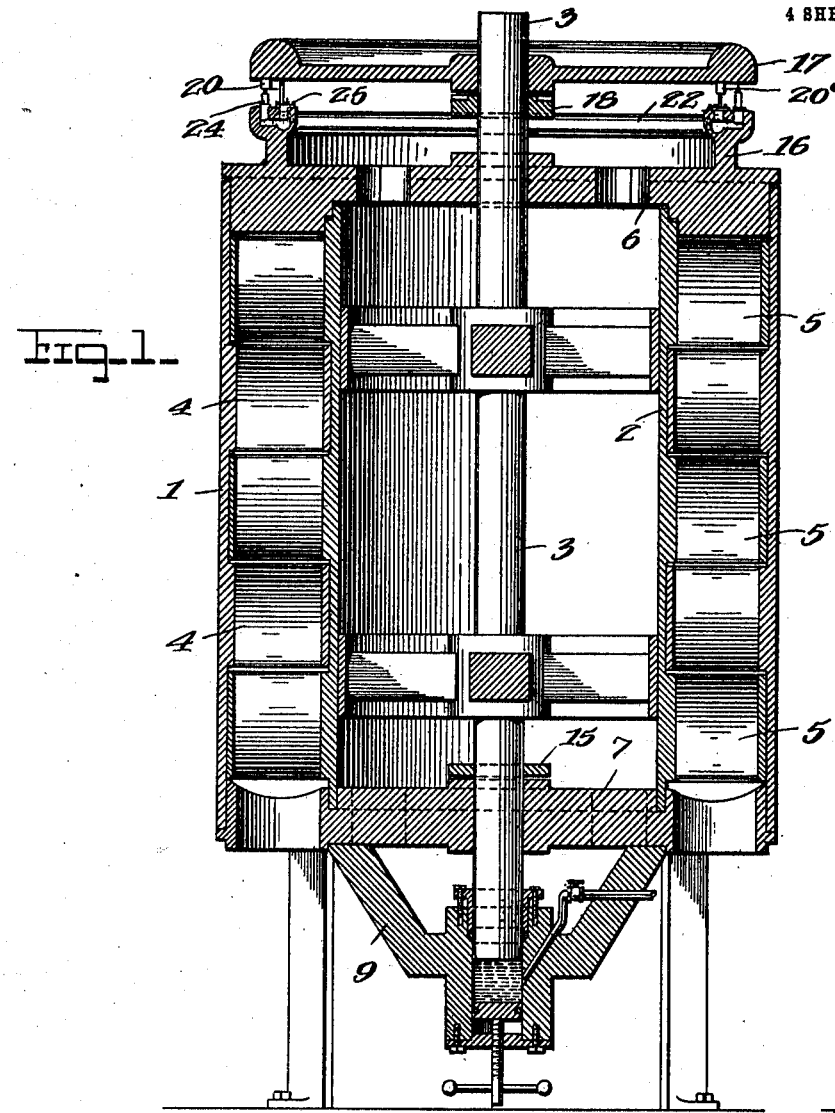
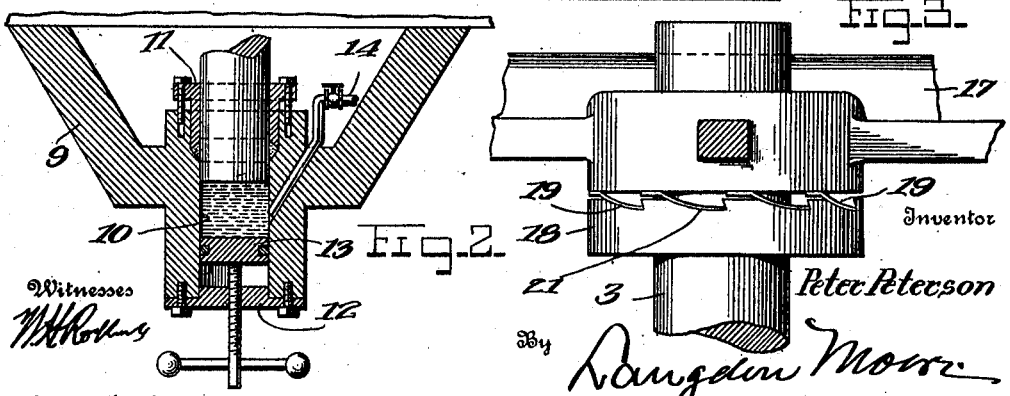

P. PETERSON.
INTERNAL COMBUSTION ENGINE.
APPLICATION FILED JUNE 1, 1909.
978,058.
Patented Dec. 6, 1910.
4 SHEETS—SHEET 2.
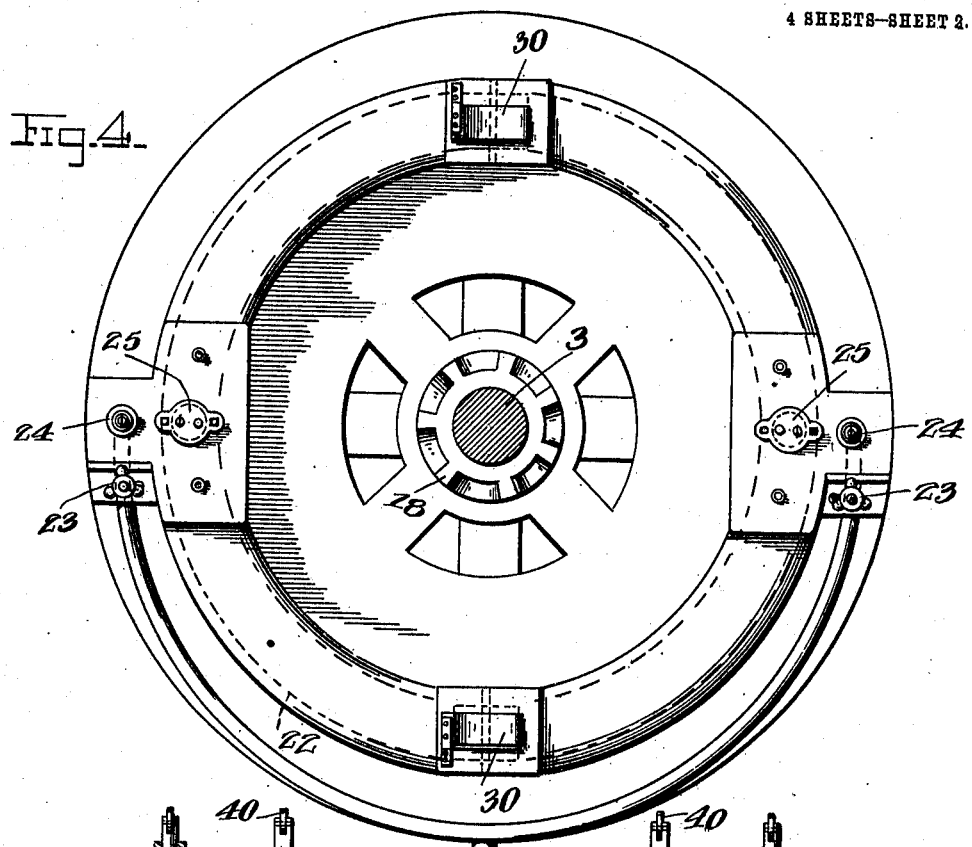
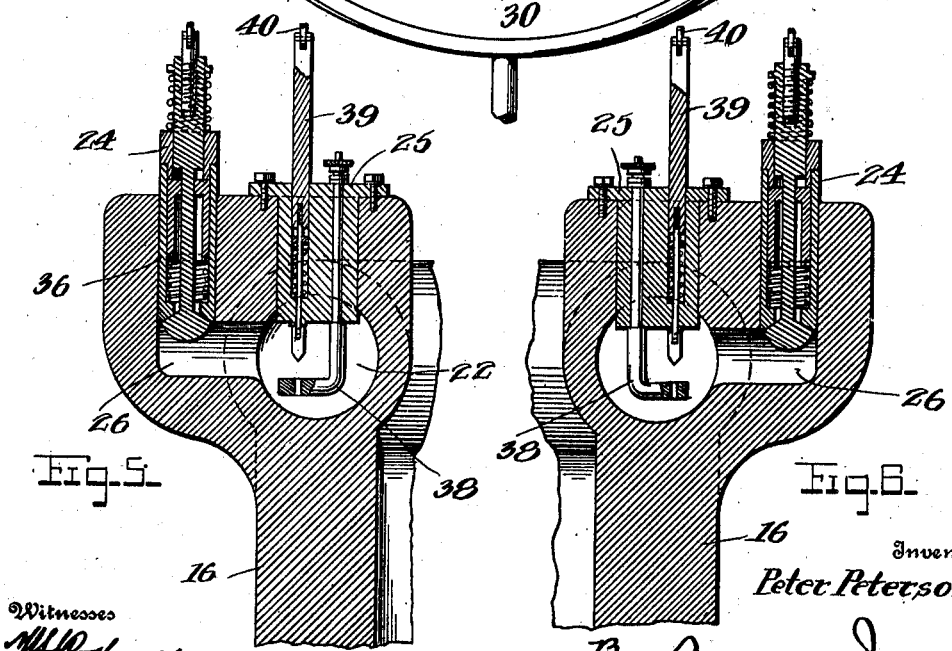
Witnesses
H. H. Rockwell
Caroline Morgan
Inventor
Peter Peterson
By Langston Moor
Attorney

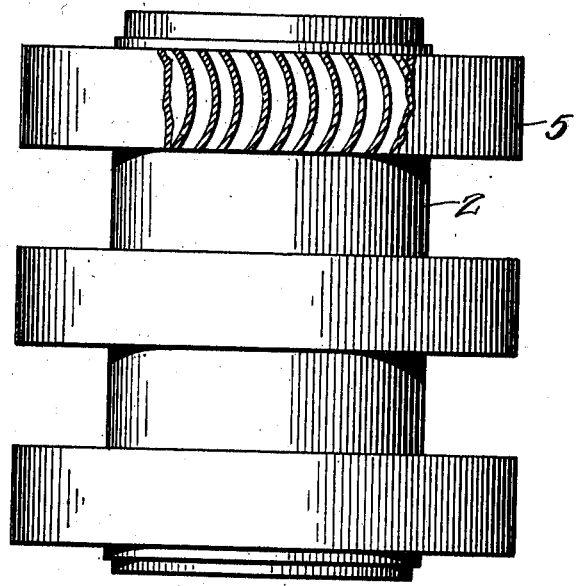
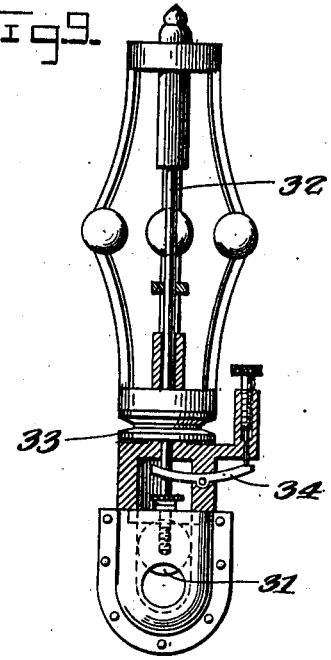
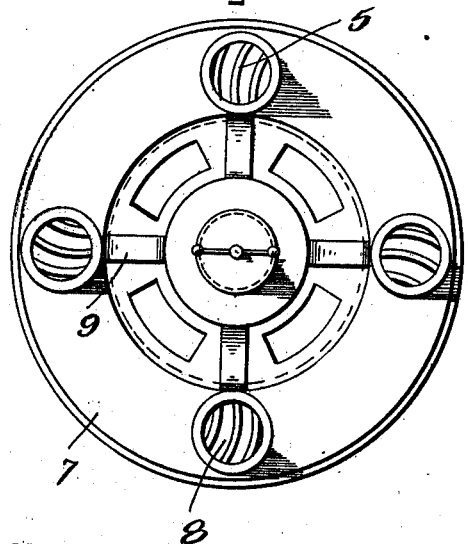
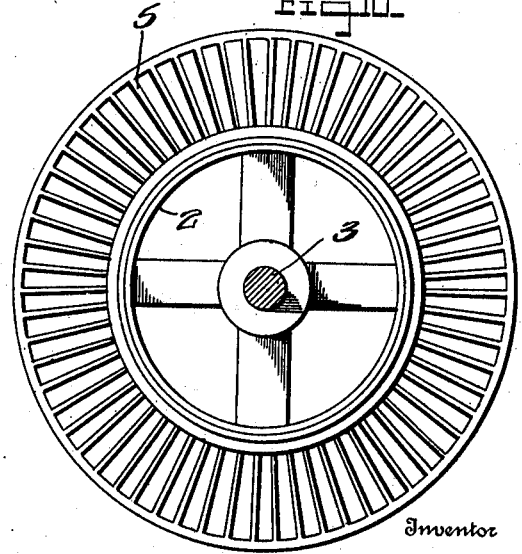

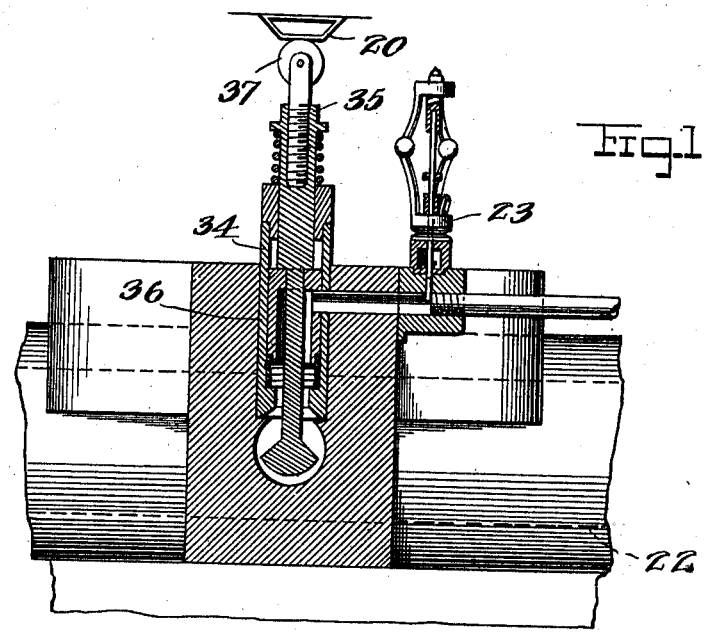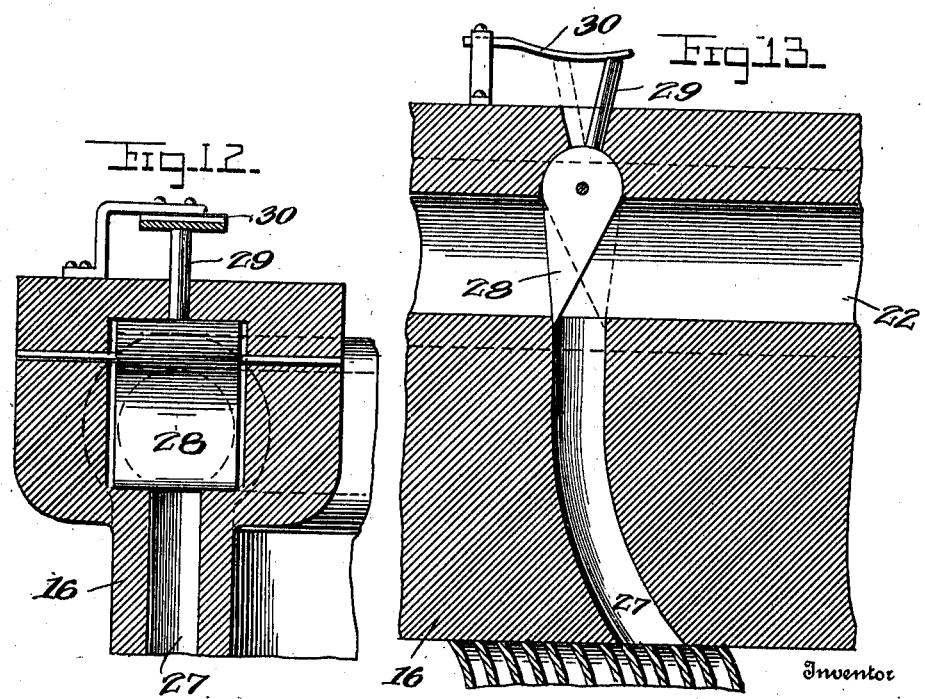

UNITED STATES PATENT OFFICE.

PETER PETERSON, OF SAN FRANCISCO, CALIFORNIA.

INTERNAL-COMBUSTION ENGINE.

978,058.  Specification of Letters Patent.  Patented Dec. 6, 1910.

Application filed June 1, 1909.  Serial No. 499,321.

*To all whom it may concern:*

Be it known that I, PETER PETERSON, a subject of Russia, residing at San Francisco, in the county of San Francisco and State of California, have invented new and useful Improvements in Internal-Combustion Engines, of which the following is a specification.

This invention relates to improvements in internal combustion engines and more particularly to a rotary engine of the turbine type.

The object of this invention is to provide an engine of this character with a device for operating the inlet valve and ignition device controlled by the rotation of the shaft. The connection between the operating device and the shaft is constructed in such a manner that the rotation of the shaft will actuate the operating device until the maximum efficiency of the engine is obtained. The maximum efficiency of the engine will develop a definite number of revolutions of the shaft per minute and when once reached a lesser number of revolutions per minute of the shaft will temporarily disconnect the operating mechanism therefrom, which will remain disconnected until the number of revolutions per minute have again advanced to the proper number. This construction together with other improvements to be described hereinafter form the subject-matter of this application.

The advantages of this invention will be obvious upon reading the following description.

While the preferred form is illustrated in the accompanying sheets of drawing, yet it is to be understood that minor detail changes may be made without departing from the scope of this invention.

Figure 1 is a view in vertical section taken through the center of this improved engine. Fig. 2 is an enlarged detail view partly in section. Fig. 3 is an enlarged detail view in side elevation. Fig. 4 is a detail plan view of the top of the casing. Fig. 5 and Fig. 6 are enlarged detail views partly in section of the inlet valves and ignition devices. Fig. 7 is a view in side elevation, with parts broken away and shown in section, of the rotating member of the turbine. Fig. 8 is a bottom plan view of the base of the casing. Fig. 9 is an enlarged detail view partly in section of the governor. Fig. 10 is a top plan view of the rotatable part of the turbine. Fig. 11 is an enlarged detail view partly in section taken through the gas inlet valve. Fig. 12 is an enlarged detail view in transverse section showing the explosion chamber closure. Fig. 13 is an enlarged detail view taken in longitudinal section showing the explosion chamber closure.

This engine comprises a vertical casing 1 which is fixed and supported in the manner shown. A rotating member 2 is mounted within the stationary casing and is secured to the vertical shaft 3. The stationary casing is provided with a plurality of parallel rows of curved vanes 4. The rotating member is in the form of a cylinder which is provided with a plurality of rows of vanes 5 extending therefrom and curved in the opposite direction from the stationary vanes 4. The oppositely curved vanes in the stationary member 1 and the rotatable member 2 are arranged to communicate with each other. The two sets of vanes alternate with each other and are so arranged that rotating vanes engage with the top 6 and bottom 7 of the stationary casing 1. Power is supplied by conducting the gases from the explosion chamber against the upper row of vanes 5 carried by the rotatable member. The gases will pass through and between the series of oppositely curved vanes and pass out through the plurality of exhaust openings 8 in the bottom of the stationary casing.

The vertical shaft 3 which is secured to and supports the rotatable member within the stationary casing is provided with an oil bearing at its lower end. A depending bracket 9 supporting the bearing is carried by the underside of the stationary casing. This bearing comprises a sleeve in said bracket forming a chamber 10 which embraces the lower end of the shaft. The upper end of the chamber is provided with a stuffing box 11, and the lower end with a closure 12 provided with a centrally located screw threaded opening. A piston 13 is mounted to slide in the chamber between the lower end of the shaft 3 and the lower closure 12. A screw threaded rod is passed through the central opening in the lower closure and engages the piston. An oil inlet tube 14 provided with a valve enters the side of the chamber. The shaft is provided with a collar 15 which will normally bear upon the upper side of the bottom plate 7 of the stationary casing. The piston is moved to the bottom of the chamber and oil is admitted, the oil valve is closed and the piston is then moved upward in the direction of the shaft by the operating rod until the collar carried by the shaft is moved out of contact with the casing. The shaft will then rotate upon oil in the chamber and be supported thereon.

The explosion chamber, inlet valve, and ignition devices are arranged in an annular projection 16 above the top 6 of the stationary casing. The operating means comprises a weighted disk 17 of the same diameter as the annular projection, loosely mounted upon the shaft 3 resting upon a collar 18 carried by the shaft. The loosely mounted disk 17 is provided with a plurality of springs 19 secured to the underside thereof arranged to engage the upper surface of the collar 18. The inlet valves and ignition devices are arranged in pairs at points diametrically opposite each other upon the explosion chamber. In each pair of these devices the inlet valve 24 is on the outer side and the ignition device 25 is upon the inner side. The loosely mounted disk 17 is provided with depending beveled lugs 20 and 20$^a$ adapted to operate the said devices. The lug 20 adapted to operate the inlet valve 24 is arranged diametrically opposite from the lug 20$^a$ adapted to operate the ignition device 25. When the engine is operating under normal condition the weight of the loosely mounted disk 17 upon the springs 19 engaging the collar 18 upon the shaft 3 is sufficient to cause the disk to rotate with the shaft and actuate the inlet valves and ignition devices. However, when the rotation of the shaft becomes less than normal the inertia of the loosely mounted disk will continue its rotation at the same speed and the springs forming the connection will slip until the speed of the shaft is increased to that of the disk. If desired the upper surface of the fixed collar 18 may be provided with a series of shouldered depressions 21 to receive the springs 19 carried by the loosely mounted disk as shown in Fig. 3, with the shoulders arranged to engage the ends of the springs to cause the disk 17 to rotate with the shaft.

The explosion chamber 22 is annular in form and extends completely around the projection upon the top 6 of the casing.
Gas or oil is led from a source of supply to both oppositely disposed inlet valves. On the supply side of each inlet valve additional valves are provided which are operated by a governor 23 connected to the rotating shaft 3. The inlet valves 24 are located upon the outer side of the explosion chamber and communicate therewith through a horizontal passage 26. The ignition device 25 is located in the explosion chamber 22 directly opposite the opening of this communicating passage 26. Half way between the ignition devices on each side of the explosion chamber a discharge opening 27 is formed in the casing leading to the top of the upper series of curved vanes 5 carried by the rotating member 2. This passage 27 is alternately placed in communication and cut off from the opposite portions of the explosion chamber by the swinging valve 28 shown in Fig. 13. This valve 28 is pivoted above the top of the explosion chamber and is provided with a member 29 extending through a slot in the upper casing of the explosion chamber. A curved spring 30 is supported above the extension in the manner shown in Fig. 13, so that the valve 28 will be positively held in one position or the other. When the explosion occurs in one side of the explosion chamber the valve will be forced over to close the other portion of the explosion chamber, and at the same time open the passage way 27 to the upper vanes. Therefore when the ignition device is operated on one side of the explosion chamber, the explosion will cut off the discharge opening from the other portion of the explosion chamber by valve 28, and as the opposite inlet valve is operated at the same time the gases entering the explosion chamber on that side will be retained therein until the ignition device on that side is operated.

The governor 23 shown in detail in Fig. 9 operates a supplemental valve 31 and controls the admission of the gas to the inlet valve. The valve 31 is of gate valve type with the stem 32 extending upward through the casing. The governor is mounted to rotate about the stem of the valve and the base of the governor is provided with a pulley wheel 33 by which it may be operatively connected by a band or strap to the shaft 3. The upper portion of the governor is secured to the base by a plurality of springs each provided with a weight in the center thereof, and a depending sleeve securing the upper end of the valve stem. A collar is secured to the valve stem and so arranged that when the valve is closed, the said collar will engage the upper extremity of the sleeve carried by the base. A friction regulating device 34 is shown in engagement with the valve stem by which the operation of the valve may be adjusted. The governor acts in the ordinary manner and it is readily seen that when the speed of the shaft becomes too great the centrifugal action upon the weights will close the valve 31 and decrease the admission of gas to the inlet valve. The governor may be so regulated that when the number of rotations of the shaft per minute exceed a certain number the valve will be entirely closed.

The inlet valve 24 is shown in detail in Figs. 5, 6 and 11. This valve provides a casing 34 having an inlet opening arranged to coincide with the pipe leading from the supply. The bottom of this casing is somewhat restricted and its lower edges bevel. The upper end of the casing is provided with a centrally perforated closure. An operating shaft 35 passes through the perforation in the upper closure and extends through the casing below the restricted lower portion. The lower portion of the operating shaft is enlarged and the upper sides of said enlargement are beveled to correspond with the beveled lower portion of the casing. The aperture between the restricted portion of the casing is somewhat larger than the diameter of the operating shaft. A shoulder is provided upon the upper end of the operating shaft and a spring is placed between this shoulder and the top of the closure, which will normally hold the enlarged lower end of the operating shaft in engagement with the beveled edges of the lower portion of the casing. Within the casing is mounted a cylindrical member 36 closed at the upper end and provided with an aperture through which the operating shaft may pass. The inner diameter of this cylinder is considerably larger than the diameter of the operating member. An aperture is formed in the upper side of the cylinder corresponding in size to the gas inlet aperture. A spring is positioned between the lower extremity of this cylinder and the restricted portion of the casing. A shoulder is provided on the upper portion of the operating member which is adapted to engage the upper closure of the cylinder. As shown in Figs. 5 and 6 the inlet valve is closed. The lower portion of the operating shaft 35 is seated against the restricted portion of the casing 34, and the movable cylinder 36 is in engagement with upper closure of the casing. In this position the shoulder on the operating member is a short distance above the upper portion of the cylinder. The opening in the cylinder 36 corresponding to the inlet opening of the casing in this position is out of register and above the said inlet opening. A wheel or anti-friction engagement 37 is provided at the upper end of the operating shaft. When the beveled lug 20 upon the underside of the wheel 17 comes in contact with the anti-friction device 37, the same will be forced downward. This will first open the lower portion of the casing 34 before engaging the movable cylinder. The movable cylinder 36 will then be engaged by the shoulder on the operating shaft which will upon continued downward movement bring the opening in the cylinder into register with the inlet opening in the casing. As the depending lug 20 passes over the operating shaft, the same will assume its original position by means of the spring on the upper side of the casing. The spring on the underside of the cylinder will cause the said cylinder to move upward and close the inlet opening before the lower end of the casing is closed by the enlarged portion of the operating shaft.

The ignition device 25 comprises a fixed member 38 and a movable member 39. The movable member 39 is normally held in the extended position by a coiled spring surrounding the lower portion thereof. One pole of a battery or other source of electricity is connected with the stationary member 38 and the circuit is completed through the movable member 39 and casing of the engine to the ground. In the normal extended position the movable member 39 is out of sparking distance from the fixed member 38, but when the depending lug 20$^a$ engages the anti-friction device 40 on the upper extremity on the movable member, the said member will be forced down within sparking distance to ignite the charge in the explosion chamber, and as the lug 20$^a$ passes the movable member 39 will resume its extended position.

The top and bottom members 6 and 7 of the fixed casing 1 are provided with a series of apertures and the spokes connecting the shaft with the rotatable member will cause a current of air to pass through the interior of the engine during the operation thereof and thus reduce the tendency of the vanes to become overheated.

A mixture of gasolene and air may be used in operating this engine, yet it is preferred to use vaporized kerosene. The explosion chamber being arranged above the stationary casing will soon become heated to an extent sufficient to vaporize the kerosene when it is admitted through the intake valve. In starting the engine it is therefore necessary to use a mixture of gasolene and air until the explosion chamber is sufficiently heated before admitting the kerosene.

It is to be noted that these inlet valves as shown and above described are of a peculiar construction especially adapted to be used where kerosene or other oil is employed. The lower casing of the valve being always closed prevents any of the gases from the explosion chamber entering into the interior and disarranging the operating parts. The lower part of the valve is opened before the oil is admitted at the top thereof, which makes it possible for any oil retained in the valve to escape into the explosion chamber before the new charge is admitted. In the closing of the valve the oil supply is cut off before the bottom of the casing is closed allowing the interior of the casing to drain before the closure thereof.

The explosion chamber being placed above the casing in the annular projection will readily allow the same to become heated for the purpose of vaporizing the kerosene or other oil, and yet at the same time will not add to the tendency of the operating parts of the turbine to become heated during the operation of the engine.

What I claim is:—

1. In a gas engine of the character described, a stationary casing, a rotatable casing, a driving shaft secured thereto, an explosion chamber above the top of the casing, an inlet valve, an ignition device, an actuating device adapted to operate said inlet valve and ignition device operated by the rotation of the shaft, and means allowing the actuating device to continue operation at the same rate upon the lesser rotation of the shaft.

2. In a gas engine of the character described, a stationary casing, a rotatable casing, a driving shaft secured thereto, an explosion chamber, an inlet valve, an ignition device, an actuating device adapted to successively operate the valve and ignition device, and means carried upon the shaft normally engaging the actuating device arranged to be disconnected upon lesser rotation of the shaft.

3. In a gas engine of the character described, a stationary casing, a rotatable casing, a driving shaft secured thereto, an explosion chamber, an inlet valve, an ignition device, an actuating device loosely mounted upon the shaft and arranged to successively operate the valve and ignition device, means normally connecting the actuating device to the shaft and disconnecting the same by lesser rotation of the shaft.

4. In a gas engine of the character described, a stationary casing, a rotatable casing, a driving shaft secured thereto, an explosion chamber, an inlet valve, an ignition device, an actuating disk loosely mounted upon the shaft, means upon said disk adapted to successively operate the valve and ignition device, a slip connection between the disk and shaft normally rotating the disk with the shaft and arranged to allow lesser rotation of the shaft without imparting lesser rotation to the disk.

5. In a gas engine of the character described, a stationary casing, a rotatable casing, a driving shaft secured thereto, an annular explosion chamber, a plurality of inlet valves and ignition devices arranged in pairs, a communicating passage from the explosion chamber to the rotatable member arranged on each side of each valve and ignition device, and means for opening and closing the passages adjacent each valve and ignition device operated by the successive explosions in each portion of the explosion chamber between the adjacent passages and means to successively operate the inlet valve and ignition device of each pair.

6. In a gas engine of the character described, a stationary casing, a rotatable casing, a driving shaft secured thereto, an annular explosion chamber, a plurality of inlet valves and ignition devices arranged in pairs, a passage from the explosion chamber to the rotatable member on each side of each pair of valves and ignition devices, a valve at each passage arranged to close the explosion chamber on either side of the passage operated by the explosion in one section of the explosion chamber to close the communication from the adjacent section with the passage and means to successively operate the inlet valve and ignition device of each pair.

7. In a gas engine of the character described, a stationary casing, a rotatable casing, a driving shaft secured thereto, an annular explosion chamber, a plurality of movable partitions in said chamber dividing the same into a plurality of segregated sections, an inlet valve and ignition device in each section, means to successively operate the inlet valve and ignition devices, a passage from the explosion chamber to the rotatable casing entering the chamber below each partition, and means caused by the explosion in one section to move the partition at each end thereof to close the adjacent end of the adjoining section from communication with said passage.

8. In a gas engine of the character described, an explosion chamber, a device for controlling the admission of mixture to the chamber comprising a casing having an inlet opening connected with the source of mixture and an outlet opening communicating with the explosion chamber, a centrally mounted reciprocable shaft extending within the explosion chamber and provided at that end with a closure for outlet, the opposite end projecting without the chamber walls and adapted to be engaged by a moving part of the engine to actuate the shaft, a spring pressed sliding member carried on the shaft passing over the inlet and actuated thereby to open the inlet after the closure on the shaft has opened the outlet and to close the inlet in advance of the closing of the outlet.

PETER PETERSON.

Witnesses:
E. LAGER,
J. F. NELSON.